United States Patent
Gatliff et al.

(10) Patent No.: US 12,426,553 B2
(45) Date of Patent: Sep. 30, 2025

(54) PLATFORMS, PLATFORM SYSTEMS, SAFETY GRATES AND RELATED METHODS FOR INSTALLATION OF VEGETATION-BASED REMEDIATION SYSTEMS

(71) Applicants: Applied Natural Sciences, Inc., Fairfield Township, OH (US); Beverly Gatliff, Fairfield Township, OH (US)

(72) Inventors: Edward Gatliff, Fairfield Township, OH (US); Paul Thomas, Cincinnati, OH (US); Bryan Fischer, Enid, OK (US)

(73) Assignee: Applied Natural Sciences, Inc., Fairfield Twp., OH (US)

( * ) Notice: Subject to any disclaimer, the term of this patent is extended or adjusted under 35 U.S.C. 154(b) by 573 days.

(21) Appl. No.: 17/933,411

(22) Filed: Sep. 19, 2022

(65) Prior Publication Data

US 2023/0085910 A1    Mar. 23, 2023

Related U.S. Application Data

(60) Provisional application No. 63/245,348, filed on Sep. 17, 2021.

(51) Int. Cl.
*A01G 23/04* (2006.01)
*B09C 1/00* (2006.01)

(52) U.S. Cl.
CPC ............... *A01G 23/04* (2013.01); *B09C 1/00* (2013.01)

(58) Field of Classification Search
CPC .................. A01G 3/04; E04G 2001/155
USPC .................................. 182/187; 47/42
See application file for complete search history.

(56) References Cited

U.S. PATENT DOCUMENTS

| | | | | |
|---|---|---|---|---|
| 4,253,579 A | * | 3/1981 | Williams | E02F 3/48 52/650.2 |
| 4,721,412 A | | 1/1988 | King et al. | |
| 5,829,191 A | | 11/1998 | Gatliff | |
| 5,829,192 A | | 11/1998 | Gatliff | |
| 5,918,556 A | * | 7/1999 | Williams | A01G 23/043 111/919 |
| 5,927,435 A | * | 7/1999 | Benton | A01M 31/02 182/116 |
| 6,189,262 B1 | | 2/2001 | Gatliff | |

(Continued)

*Primary Examiner* — Brian E Glessner
(74) *Attorney, Agent, or Firm* — Michael Best & Friedrich LLP

(57) ABSTRACT

Platforms, platform systems, and safety grates and related methods used to facilitate the installation of plant-based remediation systems are provided therein. A platform system can include a platform having a frame supporting a flooring structure that has a surface on which a worker can stand. The platform and flooring structure can have central aperture therein. The platform system can also include a sleeve frame positioned proximal to the central aperture. The sleeve frame can have sleeve clamps securable thereto for holding a sleeve ring round at least a portion of the central aperture and to hold a liner sleeve to the sleeve ring. Further, the platform system can also include a safety grate attachable to the platform. The safety grate can comprise a grid of crossbars with folding funnel guideboards secured to the grid of crossbars for funneling soil when backfilling the liner sleeve once the liner sleeve is placed in an excavated hole.

19 Claims, 12 Drawing Sheets

(56) References Cited

U.S. PATENT DOCUMENTS

| | | | |
|---|---|---|---|
| 6,205,708 B1 | 3/2001 | Gatliff | |
| 6,223,855 B1* | 5/2001 | Lindner | B62D 67/00 |
| | | | 137/234.6 |
| 6,668,977 B2* | 12/2003 | Arsenault | A01M 31/02 |
| | | | 182/187 |
| 7,083,004 B2 | 8/2006 | Roodenburg et al. | |
| 7,272,911 B2 | 9/2007 | Gatliff | |
| 8,403,058 B2 | 3/2013 | Nadarajah et al. | |
| 8,863,898 B2 | 10/2014 | Harris, Jr. | |
| 8,931,593 B2 | 1/2015 | Harris, Jr. | |
| 9,133,629 B2* | 9/2015 | Copeland | E04F 19/10 |
| 9,248,324 B1 | 2/2016 | Guthrie et al. | |
| RE46,619 E | 12/2017 | Chilton | |
| 10,125,507 B2 | 11/2018 | Stearns et al. | |
| 10,161,226 B2 | 12/2018 | Bagnaro | |
| 10,760,235 B1 | 9/2020 | Edmondson Klingback | |
| 10,987,528 B2 | 4/2021 | Wang et al. | |
| 11,013,941 B2 | 5/2021 | Teiner | |
| 11,023,818 B2 | 6/2021 | Awiszus et al. | |
| 2004/0011592 A1* | 1/2004 | Lee | E04G 1/36 |
| | | | 182/187 |
| 2004/0040784 A1 | 3/2004 | Johnson | |
| 2007/0033853 A1* | 2/2007 | Ridge | A01M 31/025 |
| | | | 43/1 |
| 2007/0256892 A1* | 11/2007 | Breedlove | E06C 1/34 |
| | | | 182/116 |
| 2009/0236180 A1* | 9/2009 | Grandy | E04G 1/36 |
| | | | 182/128 |
| 2009/0277721 A1* | 11/2009 | Weir | A01M 31/02 |
| | | | 182/115 |
| 2012/0006618 A1* | 1/2012 | DuBose | B60P 3/226 |
| | | | 182/112 |
| 2012/0037452 A1* | 2/2012 | Copeland | E04F 19/10 |
| | | | 182/128 |
| 2018/0208283 A1 | 7/2018 | Munro et al. | |

* cited by examiner

PLATFORMS, PLATFORM SYSTEMS, SAFETY GRATES AND RELATED METHODS FOR INSTALLATION OF VEGETATION-BASED REMEDIATION SYSTEMS

RELATED APPLICATIONS

The presently disclosed subject matter claims the benefit of U.S. Provisional Patent Application Ser. No. 63/245,348, filed Sep. 17, 2021, the disclosure of which is incorporated herein by reference in its entirety.

TECHNICAL FIELD

The present subject matter relates to platforms, platform systems, and safety grates used to facilitate the installation of plant-based remediation systems and related methods. In particular, the present subject matter relates to platforms, platform systems, and safety grates used in phytoremediation to facilitate the installation of plant-based remediation systems that involve borings greater than 12-inches in diameter and greater than 48-inches deep.

BACKGROUND

The preservation and protection of the environment are among the most paramount social and economic issues affecting our society today. In instances where soil and/or groundwater have been contaminated by industry, the characterization of contamination and the assessment of remediation alternatives should include methods that are effective, sustainable, and protective of human health and the environment.

During the characterization phase, contaminants in soil and/or groundwater are identified. Typical contaminants of soil and groundwater include agricultural chemicals, heavy metals, organic compounds, and other inorganic or organic substances. Once the nature and extent of contamination by any of these or other contaminants is ascertained, the feasibility of various remediation approaches must be assessed, and an appropriate methodology or methodologies selected.

These methodologies can include monitored natural attenuation as well as bioremediation techniques. Both of these methodologies take advantage of natural biological processes. Bioremediation techniques include the use of plants to facilitate the removal of contaminant mass from soil or groundwater. This particular bioremediation technique is generally referred to as phytoremediation. The natural ability of vegetation to clean contaminants from soil and groundwater is of great benefit to the environment and society. Its effectiveness and low operating costs can make it preferable to more traditional mechanical remediation systems.

The concept underlying phytoremediation is to allow vegetation to extract contaminants from the soil and/or groundwater, and/or to introduce via the root system nutrients, substrates, water, and oxygen to enhance microbial degradation and other biological remediation processes, thereby reducing contaminant mass in soil and/or groundwater. Different contaminants respond to phytoremediation processes in different ways. Some are sequestered in plant tissues while others are degraded by microbial processes in the soil surrounding the plant roots. Some contaminants pass through the plant and are transpired into the air where they are subject to photodegradation.

Phytoremediation has grown beyond simply planting vegetation in contaminated areas. Overall strategies, including a determination of what plant species to employ based on the type of contamination present at the site, the site's geographic location, and other site variables are utilized. A technique that was used in the past when planting the vegetation in a phytoremediation system has been to alternately run an auger into the ground and place a hard pipe, such as PVC piping, into the hole in the ground. The hard pipe was inserted to the point where the unsaturated layer (the vadose zone) meets the saturated layer (the capillary fringe). In employing this technique, the holes were about thirty-six (36) inches in diameter and as deep as twelve (12) feet. The hard pipes used in this technique have been from four (4) to twelve (12) feet long. The object of the hard casing was to encourage root growth in the vertical direction and prevent the more natural horizontal root growth near the surface since there may be less contamination near the surface level. However, the use of hard casings is expensive at remediation sites which include many trees. Perhaps more importantly, surface water migrates vertically along the hard casing to deeper levels. This affects the root growth in that the deeper root system would be less apt to develop to seek water and nutrients at a deeper level in order to meet its needs for growth, and instead would feed on the migrating surface water.

To combat such issues, trees are grown to be harvested for use in remediating contaminated soil and/or groundwater. In particular, trees are grown in a hole in the earth which has been structured to influence the downward growth of the root system of the trees. Each tree is harvested with its resulting substantially long and narrow root system, transported to a contaminated site, and replanted to facilitate remediation of contaminated soil and/or groundwater at the contaminated site.

To replant the trees in a contaminated site, a hole can be dug by a large auger, and a liner, or sleeve, can be placed therein to continue to direct growth of the root system in a direction that facilitates removal of contaminants from soil and groundwater. The excavated hole with the liner sleeve therein can be backfilled with soil mixtures that can facilitate phytoremediation processes to remove contaminants from the soil and groundwater as described above. The trees being replanted can later be placed in the lined and backfilled hole. The excavated hole that is dug needs to be substantial in size and workers installing the plant-based remediation system can be exposed to hazardous conditions. For example, workers are required to work around and need access to the large, excavated holes during the lining of the excavated holes; while inserting and positioning tubing and other downhole devices used to help access the contaminated groundwater and soil used for monitoring and facilitating growth for the trees once planted; and during the backfilling of the excavated holes once the liners and the downhole devices are properly positioned. All these aspects can be hazardous to the workers installing a plant-based remediation system.

Thus, a need exists for providing easier and safer access to the excavated holes for installation of plant-based remediation systems.

SUMMARY

The present subject matter relates to platforms, platform systems, and safety grates used for installation of plant-based remediation systems. Methods related to the assembly and use of the platforms, platforms systems and safety grates used in conjunction with platforms herein are also provided.

Thus, it is an object of the presently disclosed subject matter to provide platforms, platform systems, and safety grates used for installation of plant-based remediation systems as well as methods related thereto. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1:
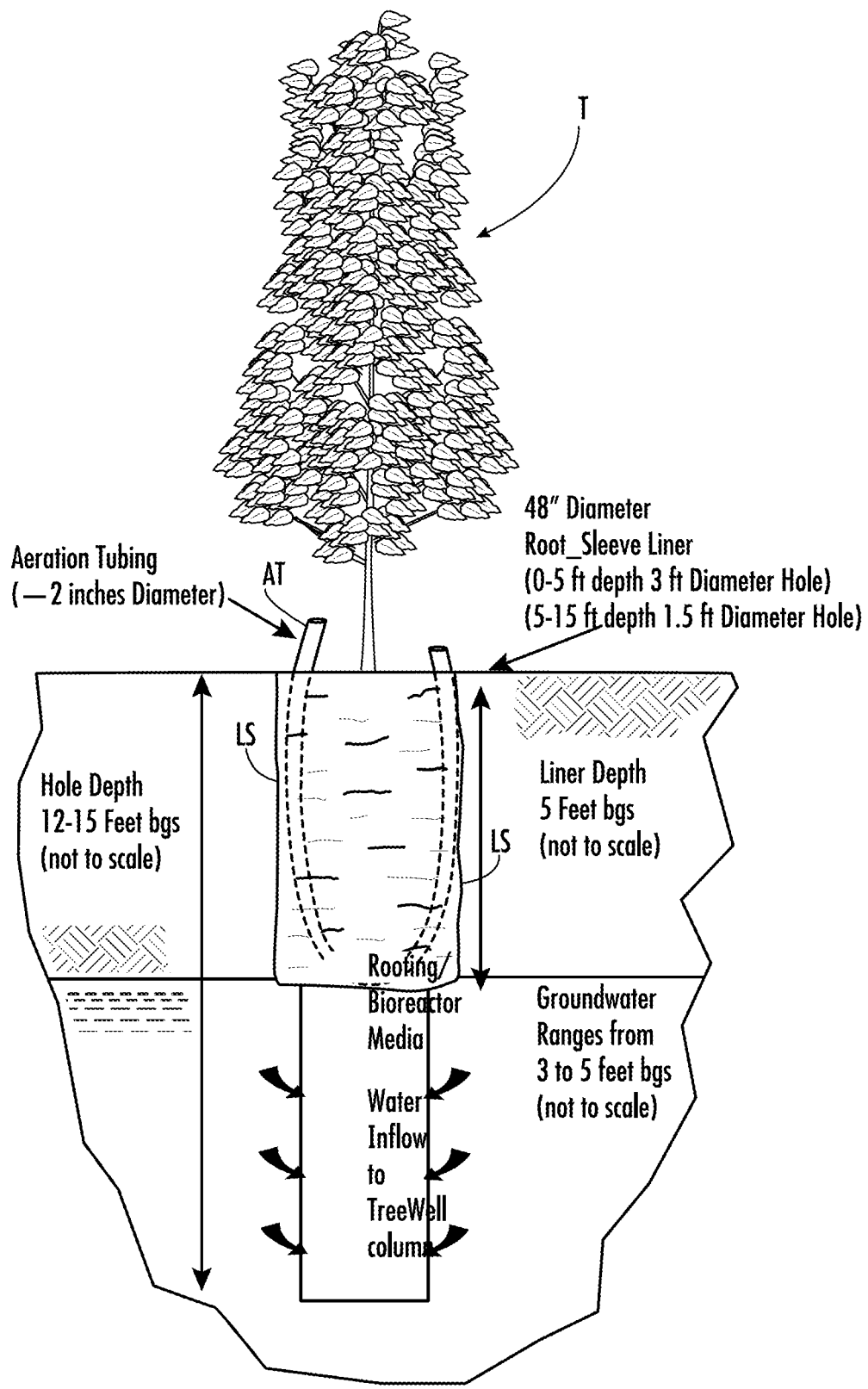
FIGS. 1 and 2 illustrate schematic partial cross-sectional views of embodiments of tree transplantations used in phytoremediation systems according to the present subject matter.

Repeat use of reference characters in the present specification and drawings is intended to represent the seam or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. It is to be understood by one of ordinary skill in the art that the present discussion is a description of exemplary embodiments only and is not intended as limiting the broader aspects of the present subject matter, which broader aspects are embodied in exemplary constructions.

Although the terms first, second, right, left, front, back, top, bottom, etc. may be used herein to describe various features, elements, components, regions, layers and/or sections, these features, elements, components, regions, layers and/or sections should not be limited by these terms. These terms are only used to distinguish one feature, element, component, region, layer, or section from another feature, element, component, region, layer, or section. Thus, a first feature, element, component, region, layer, or section discussed below could be termed a second feature, element, component, region, layer, or section without departing from the teachings of the disclosure herein.

Similarly, when a feature or element is being described in the present disclosure as "on" or "over" another feature or element, it is to be understood that the features or elements can either be directly contacting each other or have another feature or element between them, unless expressly stated to the contrary. Thus, these terms are simply describing the relative position of the features or elements to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations of the shapes and/or positions of features, elements, or components within the illustrations because of, for example but not limited to, user preferences, manufacturing techniques and/or tolerances are expected. Shapes, sizes and/or positions of features, elements or components illustrated in the figures may also be magnified, minimized, exaggerated, shifted, or simplified to facilitate explanation of the subject matter disclosed herein. Thus, the features, elements or components illustrated in the figures are schematic in nature and their shapes and/or positions are not intended to illustrate the precise configuration of the subject matter and are not necessarily intended to limit the scope of the subject matter disclosed herein unless it specifically stated otherwise herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

The present subject matter relates to platforms, platform systems, and safety grates used for installation of plant-based remediation systems. The present subject matter also relates to methods for making and for using platforms, platform systems, and safety grates used in the installation of plant-based remediation systems.

Figure 2:
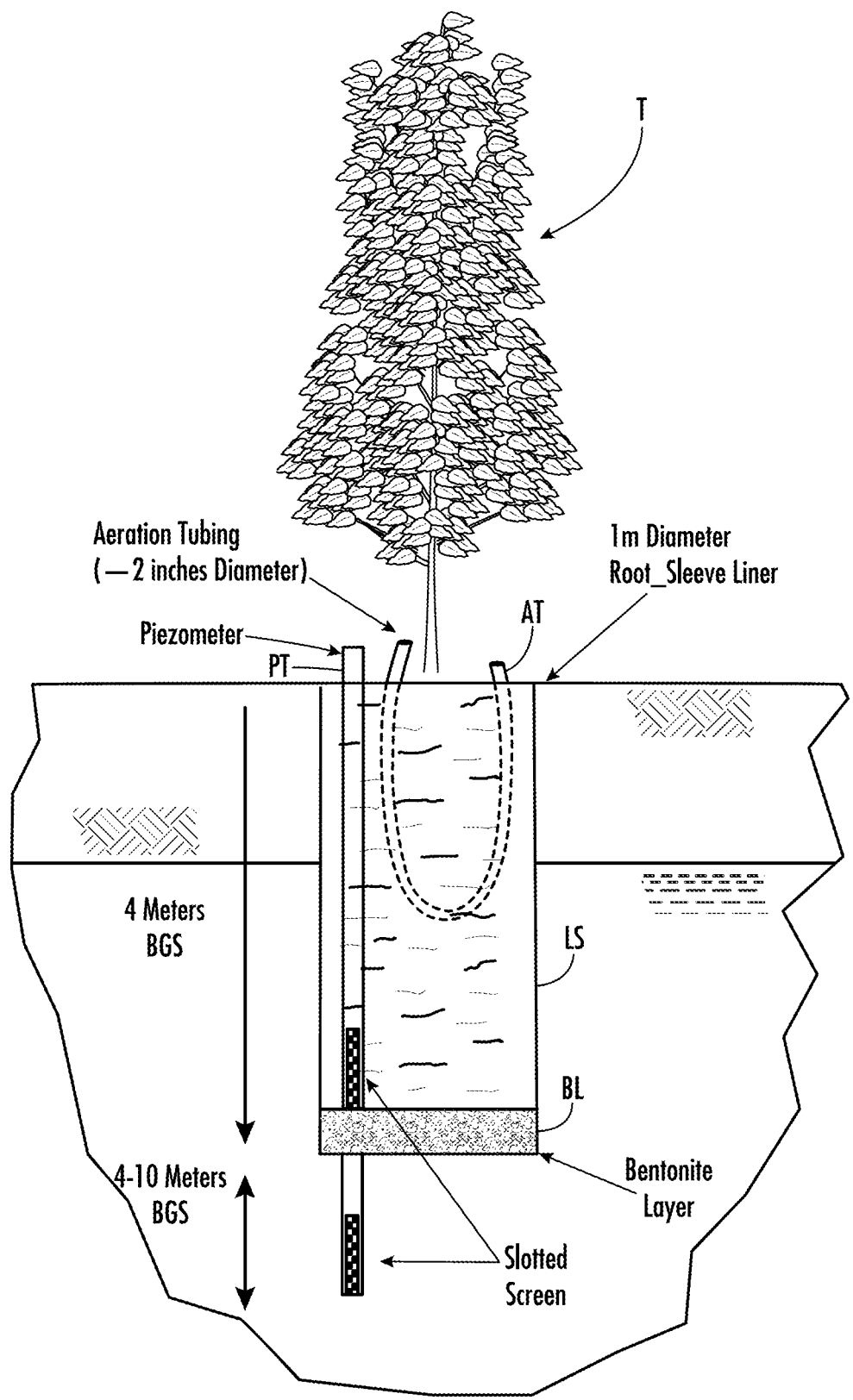

FIGS. 1 and 2 show trees T grow in a first location and then transplanted in locations with contaminated soil and/or groundwater using systems and methods outlined in U.S. Pat. Nos. 5,829,191; 5,829,192; 6,289,262; 6,205,708; and 7,272,911, all of which are incorporated herein in their entireties. A hole can be excavated in the area containing the contaminated soil or groundwater and a liner sleeve LS can be placed in the hole to provide a wall liner within the hole. Aeration tubing AT can be inserted into the hole to provide oxygen to the root system of the tree T once the tree is installed. The tree T is transplanted into the liner sleeve within the hole after the liner sleeve is backfilled with a soil or soil mixture. The liner sleeve prevents unwanted water in the subsurface from being absorbed by the root system of the tree T so that the root system obtains its water from the contaminated soil and/or groundwater such that the root system and the surrounding soil act as a bioreactor to remove and process the contaminants from the soil and/or groundwater.

As shown in FIG. 2, for deep groundwater contamination, the liner sleeve LS can have a closed bottom which rests on a bentonite layer BL. To allow the deep contaminated groundwater to move upward into the liner sleeve, well casing PT can be inserted into and through the liner sleeve LS and the bentonite layer to the desired depth where the groundwater is contaminated. A well screen at the bottom of the well casing allows the contaminated groundwater to flow into the well casing and, assuming that the groundwater adjacent to the well screen is under sufficient hydraulic head, upward and out of a second well screen located inside the liner sleeve LS so that the root system of the tree T can consume the groundwater and move the contaminants into parts of the remediation system where they can be transformed, sequestered, or transpired.

Figure 3:
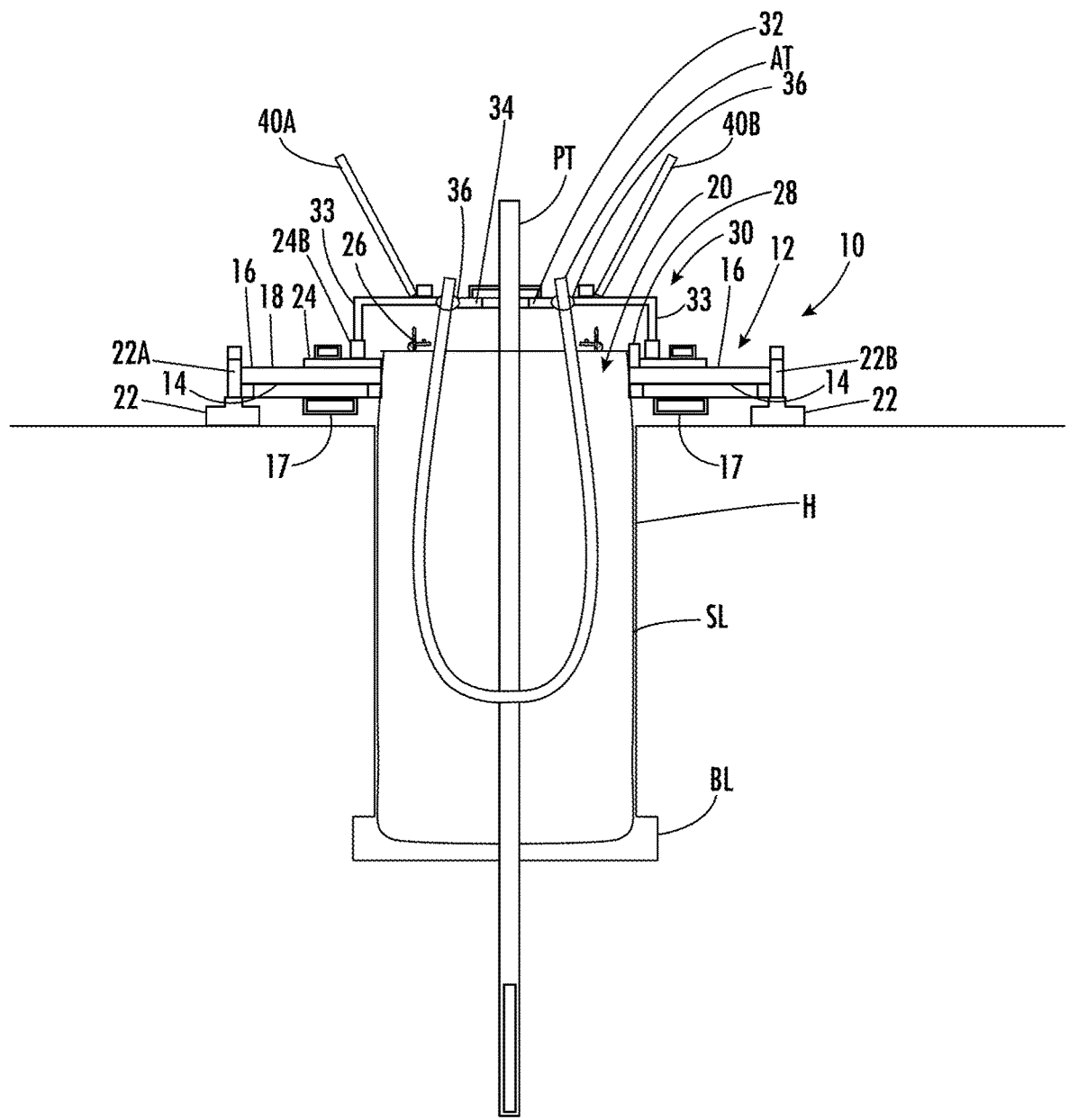
FIG. 3 illustrates a vertical cross-sectional view of an embodiment of a platform system in use for installation of a plant-based remediation system to treat contaminated soil and/or groundwater according to the present subject matter.

To facilitate the replanting of these trees T, a platform can be used to aid and help protect workers during installation of plant-based remediation systems, particularly, during the lining of an excavated hole, positioning of downhole devices, and backfilling of the lined excavated hole in a safe and effective manner. Referring to FIG. 3, such a platform system, generally 10, for installation of plant-based remediation systems for treatment of contaminated soil and/or groundwater is provided. A hole H can be excavated with the platform system 10 placed around and over the excavated hole H. Referring to FIGS. 3-12, the platform system 10 can comprise a platform 12 comprising a frame 14 that can support a flooring structure 16 having a surface 18 on which a worker can stand and work around the excavated hole as needed. The flooring structure 16 can comprises a grating that provides a gripping surface and allows rain and particulate matter, such as soil, to pass therethrough. For example, the flooring structure 16 can be an expanded metal material that is sturdy and tread-like, but that allows soil and water to fall between the expansions. The platform 12 and the flooring structure 16 forming central aperture 20 therein that resides over the excavated hole H when the platform system 10 is properly positioned for lining and backfilling the excavated hole H. In particular, in some embodiments, the platform 12 and the flooring structure 16 can have a U-shape with an open side OS on one side such that the central aperture 20 extends through the open side OS.

Figure 6:
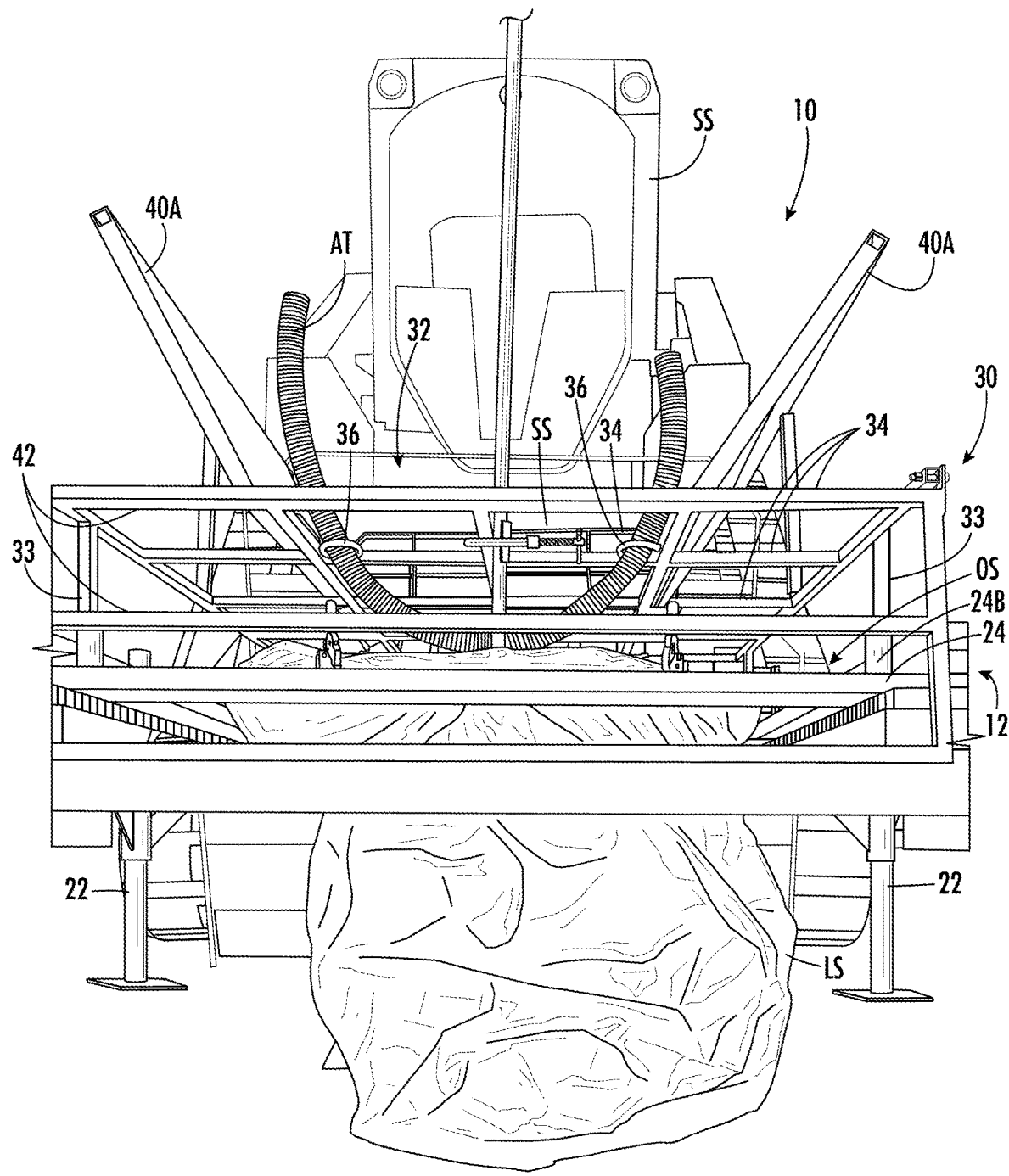
FIG. 6 illustrates a side perspective view of the embodiment of the assembled platform system according to FIG. 5 being transported to a site for installation of a plant-based remediation system according to the present subject matter.
Figure 7:
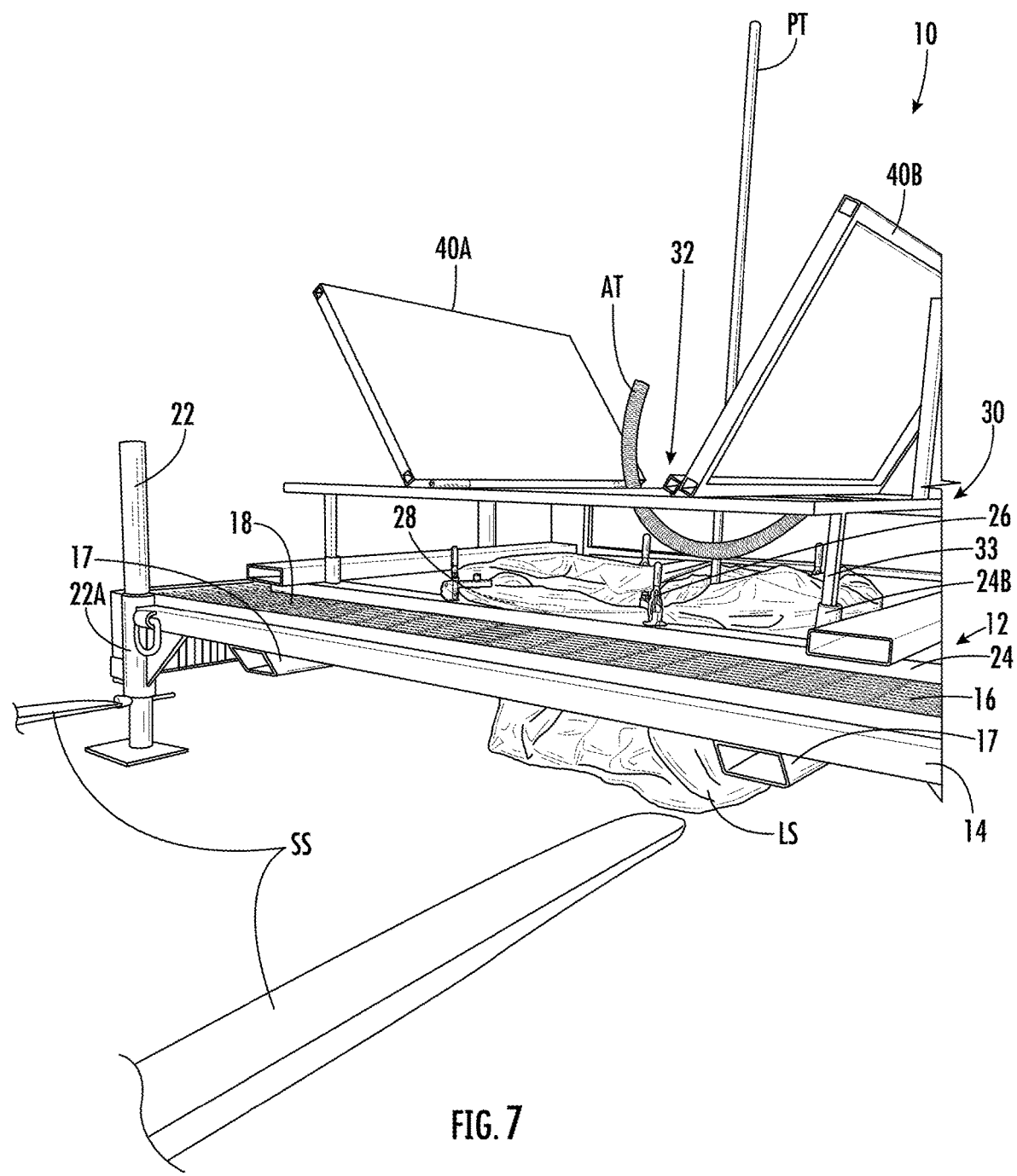
FIG. 7 illustrates a side perspective view of the embodiment of the assembled platform system according to FIG. 5 after being delivered to a desired site according to the present subject matter.
Figure 8:
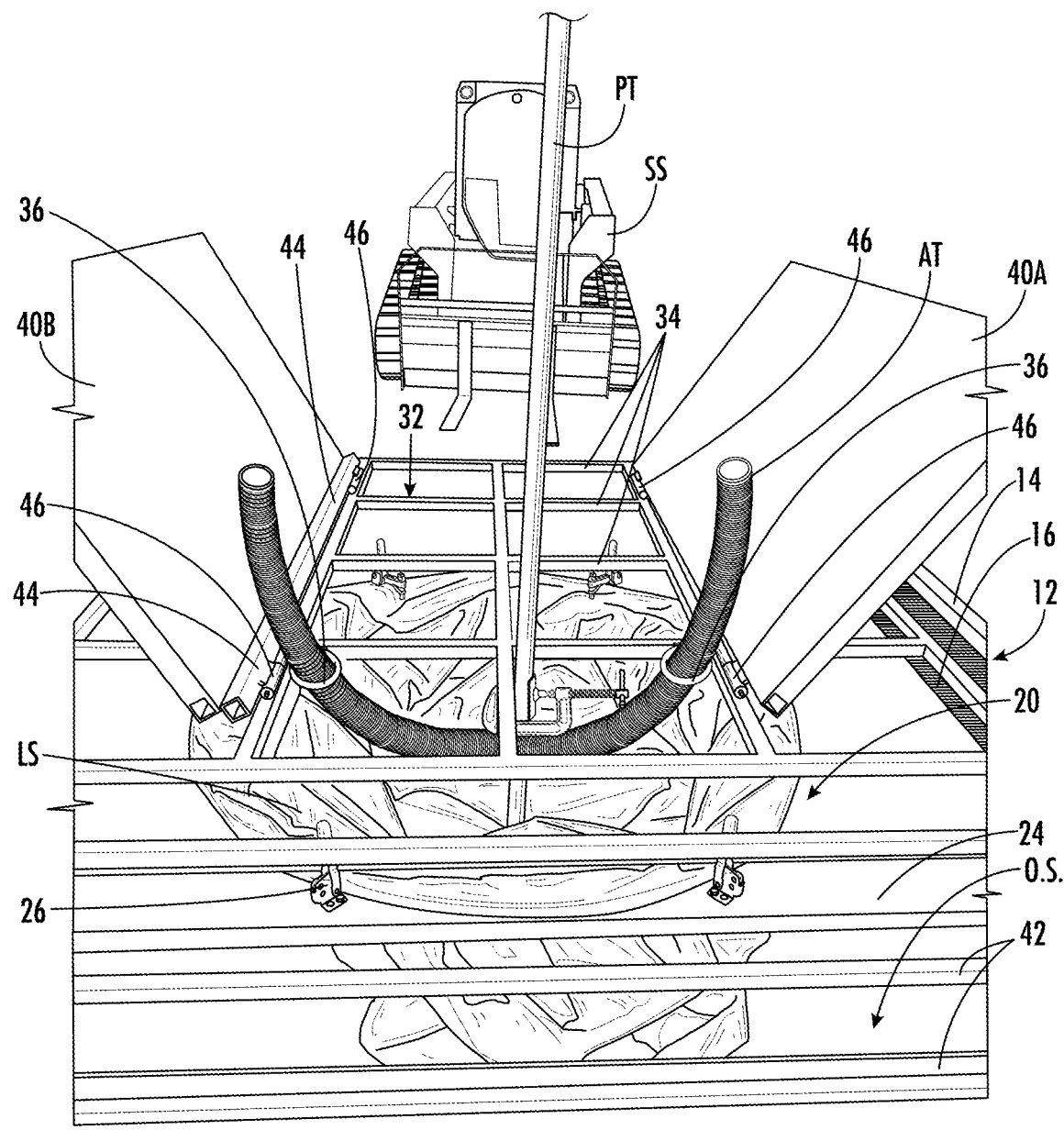
FIG. 8 illustrates a front perspective view of the embodiment of the assembled platform system according to FIG. 5.

The platform system 10 can also comprise adjustable legs 22 secured to the frame 14 of the platform 16 to permit the adjusting of the height of the platform 12. Using the adjustable legs 22, the height of the platform 12 can be adjusted from about one (1) foot to about three (3) feet tall depending on the height needed. In some of the embodiments, the frame 14 can comprise leg holders 22A, 22B in which the adjustable legs 22 can be secured with a leg holder 22A, 22B at each of the four corners of the platform 12 and one or more cross bars between the leg holders 22A, 22B on three sides of the platform 12. The platform 12 can also comprise foldable, or retractable steps 15 that can be folded downward from a storage position for transport to a deployed position when the platform 12 is installed to facilitate access to flooring structure 16 of the platform 12. Additionally, the platform 12 can comprise fork channels 17 that can be secured beneath the flooring structure 16 on a backside of the platform 12 and on either side of the central aperture 20. The fork channels 17 can be used to lift and transport the platform 12 and the platform system 10, when assembled, to a desired location. Skid-steer forks on skid-steer SS which are spaced wider apart than normal skid-steer forks can be inserted in the fork channel 17 and the skid-steer SS can lift and then transport the platform 12, or platform system 10, as needed as shown in FIG. 6.

Additionally, the platform system 10 can comprise a sleeve frame 24 that can be positioned proximal to the central aperture 20. The sleeve frame 24 can comprise sleeve clamps 26 securable thereto for holding a sleeve ring 28 proximal to at least a portion of the central aperture 20 and to hold a liner sleeve LS to the sleeve ring 28. For example, in some embodiments, the sleeve clamps 26 can be secured to the sleeve frame 24 to hold a sleeve ring 28 around at least a portion of the central aperture 20 and to hold a liner sleeve LS to the sleeve ring 28. In some embodiments, sleeve clamps 26 can be secured to the sleeve frame 24 to hold a sleeve ring 28 above at least a portion of the central aperture 20 and to hold a liner sleeve LS to the sleeve ring 28. In some embodiments, the sleeve clamps 26 can be fixedly secured to the sleeve frame 24. In some embodiments, the sleeve ring 28 can have a diameter that corresponds to a diameter of the hole excavated. In some embodiments, the sleeve ring 28 can have a diameter that corresponds to a diameter of the liner sleeve LS. In such a manner, the liner sleeve LS can be held substantially open with the sleeve ring 28 and the sleeve ring 28 can be securely held to the sleeve frame 24 and the platform 12 with the sleeve clamp 26 to facilitate the backfilling of the liner sleeve LS within the hole H. In some embodiments, the sleeve ring 28 can have diameter of between or including about 24 inches and about 60 inches. In some embodiments, the sleeve ring 28 can have diameter of between about 36 inches and about 60 inches. In some embodiments, the sleeve ring 28 can have diameter of about 24 inches. In some embodiments, the sleeve ring 28 can have diameter of about 36 inches. In some embodiments, the sleeve ring 28 can have diameter of about 48 inches. In some embodiments, the sleeve ring 28 can have diameter of about 60 inches.

Further, the platform system 10 can comprise a safety grate 30 that can be configured to attach to the platform 12 and extend over the central aperture 20. The safety grate 30 can comprise a grid 32 of crossbars 34. The grid 32 of crossbars 34 can comprise a top portion which faces outward when the safety grate 30 is installed in the platform system 10 proximate to the central aperture 20 in the platform 12 and a bottom portion which faces the platform 12 and the central aperture 20 when installed in the platform system 10 proximate to the central aperture in the platform 12. In some embodiments, the safety grate 30 can comprise legs 33 extending downward from the safety grate 30. For example, the legs 33 can extend downward from the bottom portion of the grid 32 of crossbars 34 of the safety grate 30. The safety grate 30 and the crossbars 34 that form the grid 32 can comprise a square or circular cross-sectioned metal tubing. The walls of the metal tubing can have a thickness so that the safety grate 30 has a rigidity to withstand the forces placed on it during movement, transport, and the dumping of soil therethrough. For example, the square or circular cross-sectioned metal tubing can provide a sturdiness that permits the safety grate 30 to be lifted from the platforms by a skid-steer SS for transport.

Figure 9:
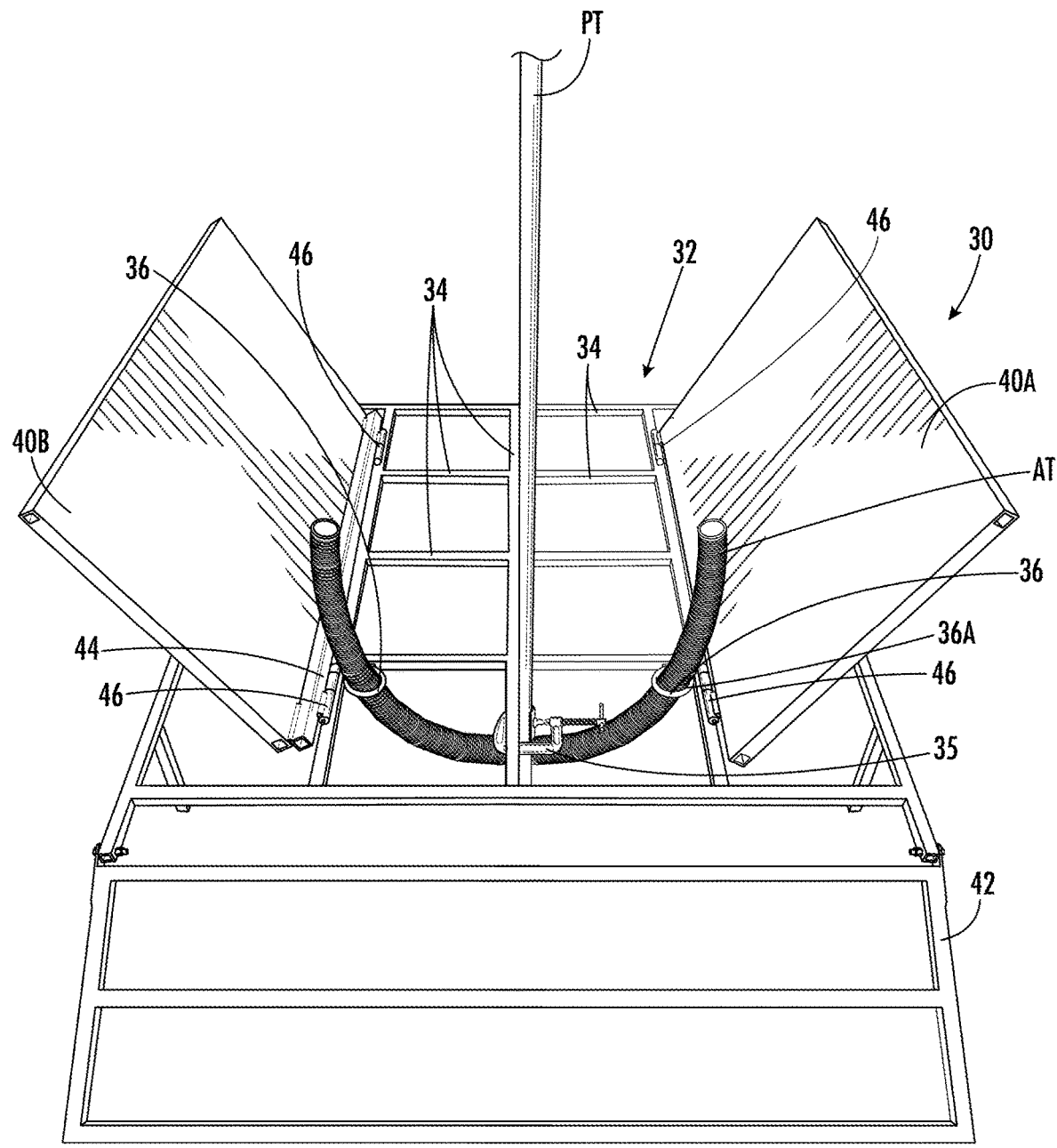
FIG. 9 illustrates a front perspective view of an embodiment of a safety grate used in an embodiment of a platform system according to the present subject matter.
Figure 10:
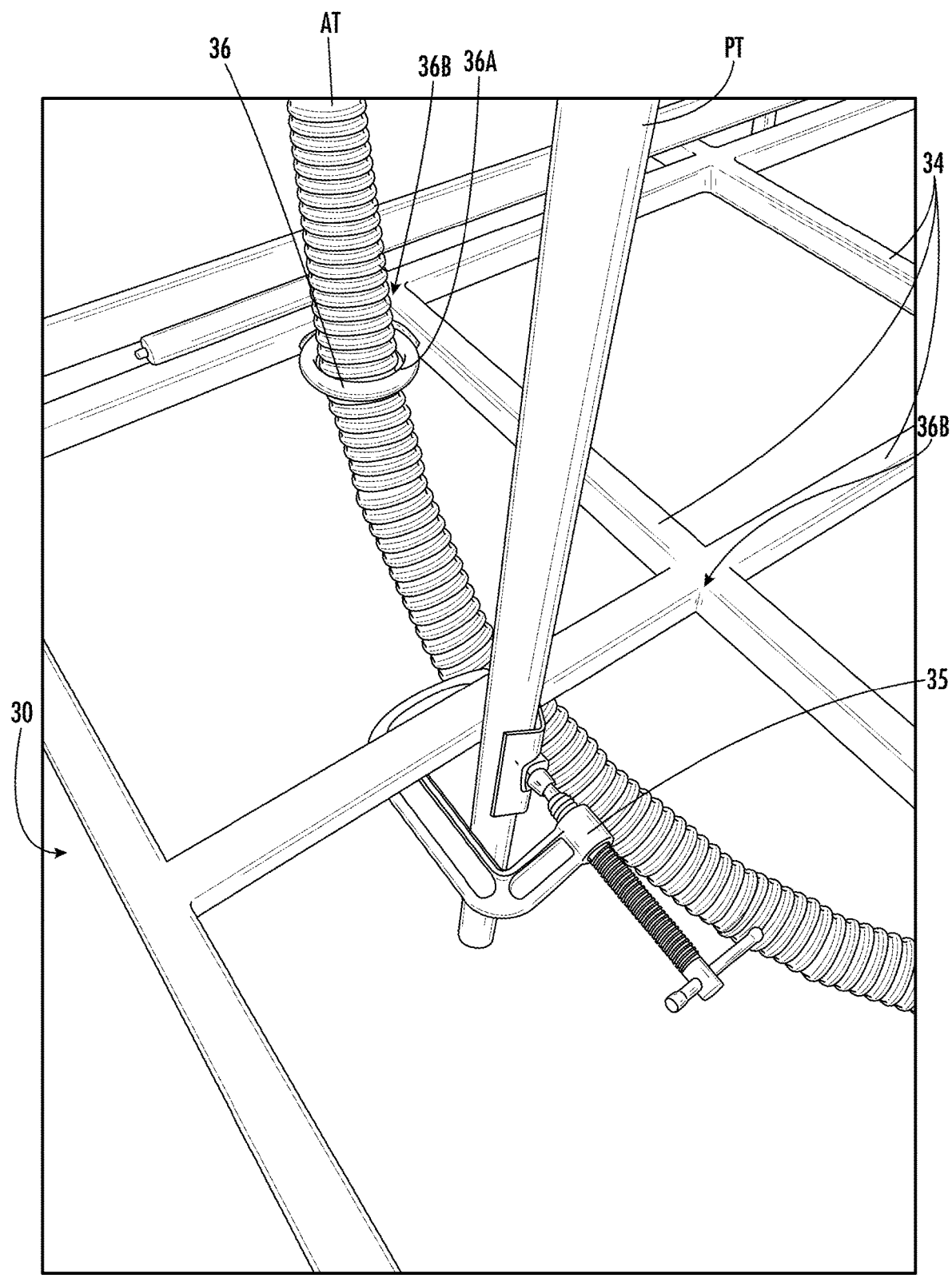
FIG. 10 illustrates a perspective view of a portion of the embodiment of the safety grate according to FIG. 9.
Figure 11:
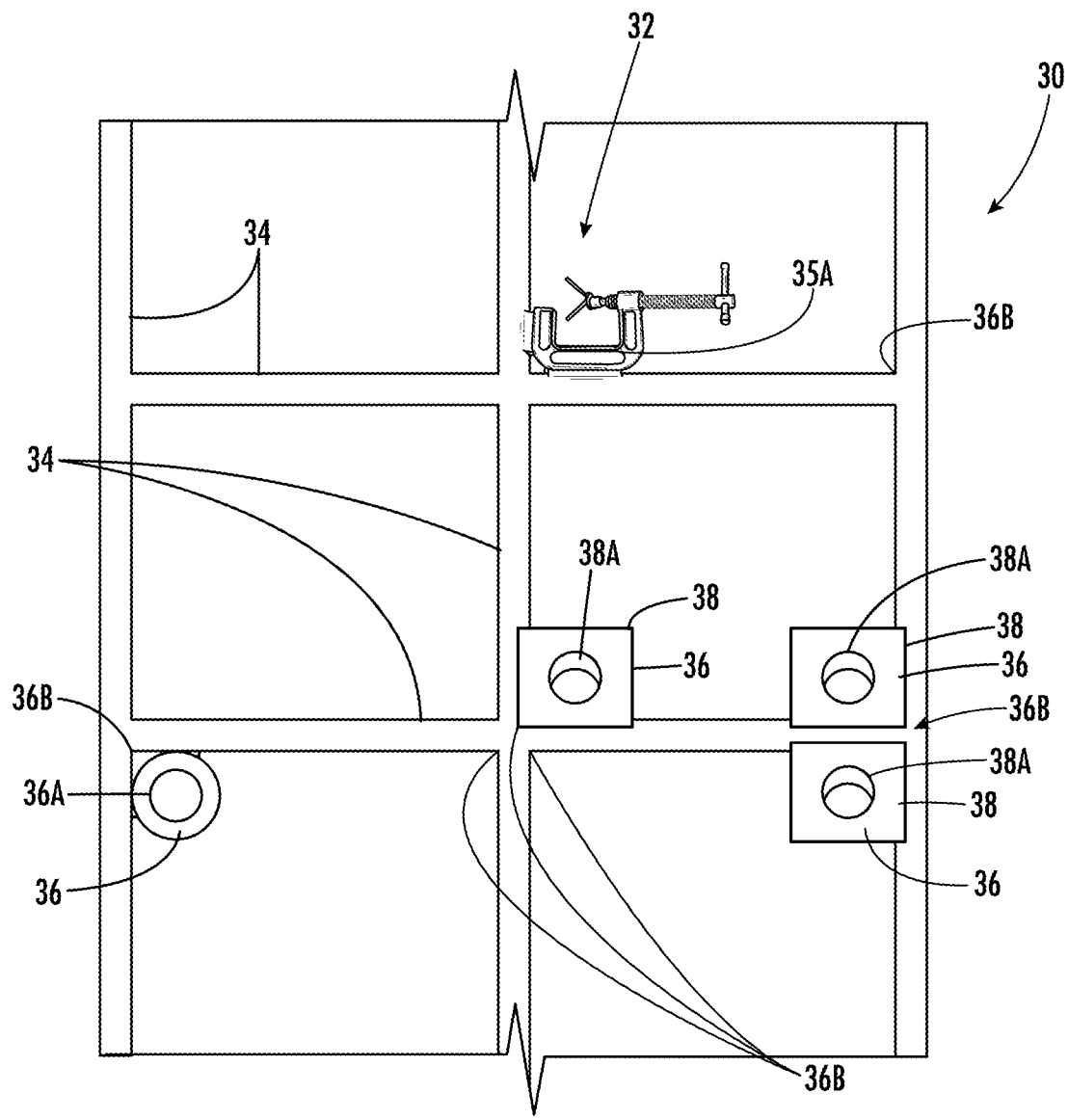
FIG. 11 illustrates a top plan view of a portion of the embodiment of the safety grate according to FIG. 9.

Referring to FIGS. 8-11, downhole material holders 36 can be secured to the one or more of the crossbars 34 that forms the grid 32 of the safety grate 30 for holding tubing, such as aeration tubing AT, or other downhole devices that is to reside in the excavated hole H. In some embodiments, the downhole material holders 36 can be permanently secured to a portion of the grid 32 of crossbars 34 of the safety grate 30. In some embodiments, one or more of the downhole material holders 36 can comprise a ring 36A welded to two crossbars 34 that extend about perpendicular to each other to form a grid corner 36B such that the ring 36A resides in the grid corner 36B. Additionally, as shown in FIG. 11, in some embodiments, one or more of the downhole material holders 36 can comprise a holder plate 38 having a holder aperture 38A therethrough that is attachably and detachably securable to a portion of the grid 32 of crossbar 34 of the safety grate 30 that extends over the excavated hole H when the platform system 10 is properly positioned over the excavated hole. The holder plate 38 can provide flexibility of where to place the aeration tubing or other downhole devices in relation to the safety grate 30 and the excavated hole H in which the tubing or downhole devices are be placed.

Additionally, referring to FIGS. 9-11, the safety grate 30 can comprise one or more downhole device clamps 35 that can be securable to a crossbar 34 of the grid 32 of crossbars 34 for holding tubing for introducing a camera or a piezometer. The movable and/or the fixed jaws of the tubing clamps 35 can be shaped to receive and safely hold tubing or other downhole devices, which can be used with a piezometer or for insertion of a camera, for example. The downhole device clamps 35 can be detachable such that they are only attached when needed as shown in FIG. 10. In some embodiments, the safety grate 30 can comprise one or more downhole device clamps 35A that are permanently secured to the safety grate 30 as shown in FIG. 11. For example, in some embodiments, a downhole device clamp 35A can be welded to two crossbars 34 that extend about perpendicular to each other to form a grid corner 36B such that the tubing clamp 35A resides in the grid corner 36B.

The safety grate 30 can also comprise folding funnel guideboards 40A, 40B that can be foldably secured to the grid 32 of crossbars 34 for funneling soil when backfilling the liner sleeve LS once the liner sleeve LS is placed in an excavated hole H. The folding funnel guideboards 40A, 40B can be secured to a top portion of the grid 32 of crossbars 34 by hinges 46 such that the folding funnel guideboards 40A, 40B fold in on top of the grid 32 of crossbars 34 into a storage position. For example, in some embodiments, the folding funnel guideboards 40A, 40B can comprise a first folding funnel guideboard 40A that can be secured on a first side of the grid 32 of crossbars 34 and a second folding funnel guideboard 40B that can be secured on a second side of the grid 32 of crossbars 34. In some embodiments, for instance, the second folding funnel guideboard 40B can comprise a spacer bar 44 that is secured to the hinges 46 for the second folding funnel guideboard 40B such that the first folding funnel guideboard 40A is foldable inward to reside against the grid 32 of crossbars 34 and the second folding funnel guideboard 40B can be foldable inward to reside against the first folding funnel guideboard 40A.

Figure 5:
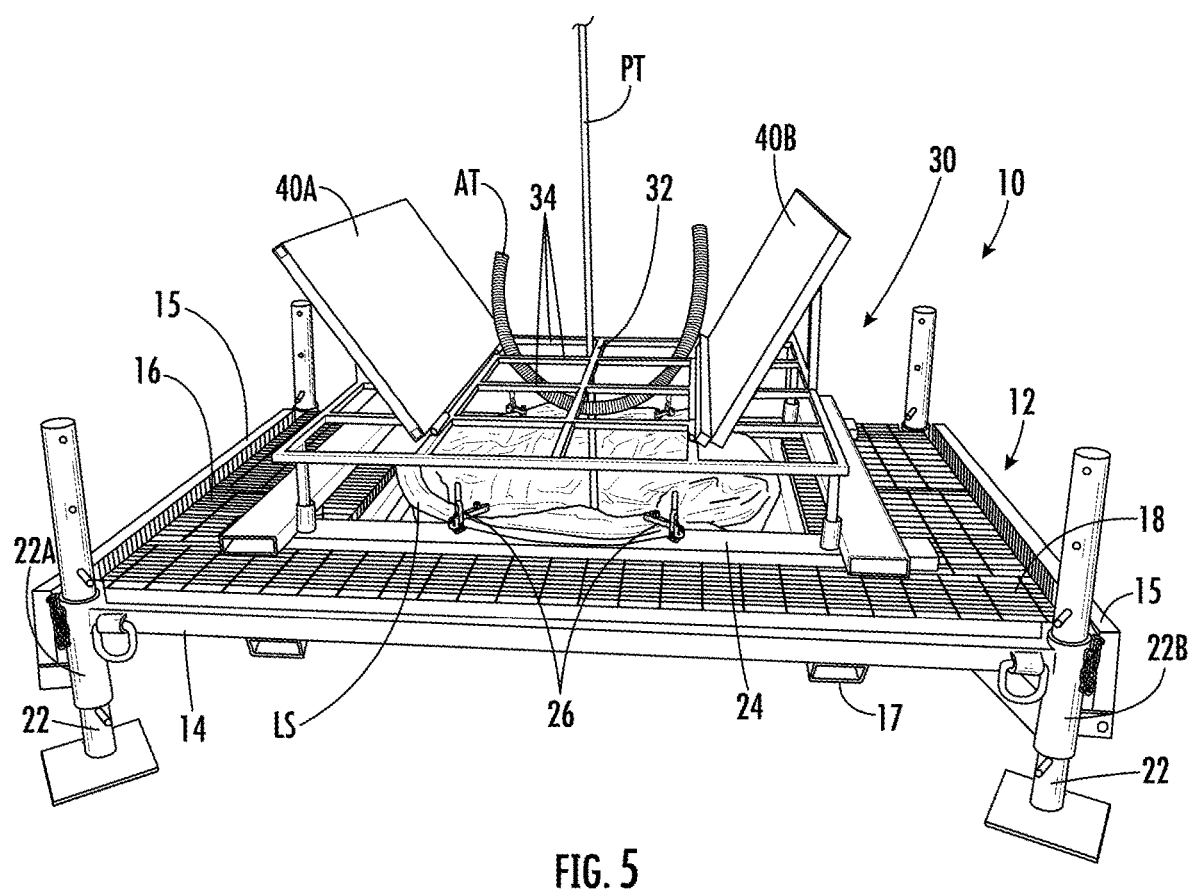
FIG. 5 illustrates a perspective view of an embodiment of a platform system for installation of a plant-based remediation system to treat contaminated soil and/or groundwater according to the present subject matter.

With both folding funnel guideboards 40A, 40B folded inward in such a manner, the folding funnel guideboards 40A, 40B can be placed in a position that is more conducive for transporting the safety grate 30. In particular, in some embodiments, the spacer bar 44 on the second folding funnel guideboard 40B can comprise a thickness that corresponds to the thickness of a first folding funnel guideboard 40A such that the second folding funnel guideboard 40B lays flat against the first folding funnel guideboard 40A. In some embodiments, the first folding funnel guideboard 40A and second folding funnel guideboard 40B are foldable outward to a funneling position as shown in FIGS. 3 and 5 in which the first folding funnel guideboard 40A and second folding funnel guideboard 40B extend outward at about 120° as measured from a center portion of the grid 32 of crossbars 34. By extending at these angles, the first and second foldable funnel guideboards 40A, 40B can facilitate the guidance of the soil being delivered to the interior of the liner sleeve LS in large amounts during backfilling, for example, soil being delivered by small CTL buckets on a backhoe.

Figure 12:
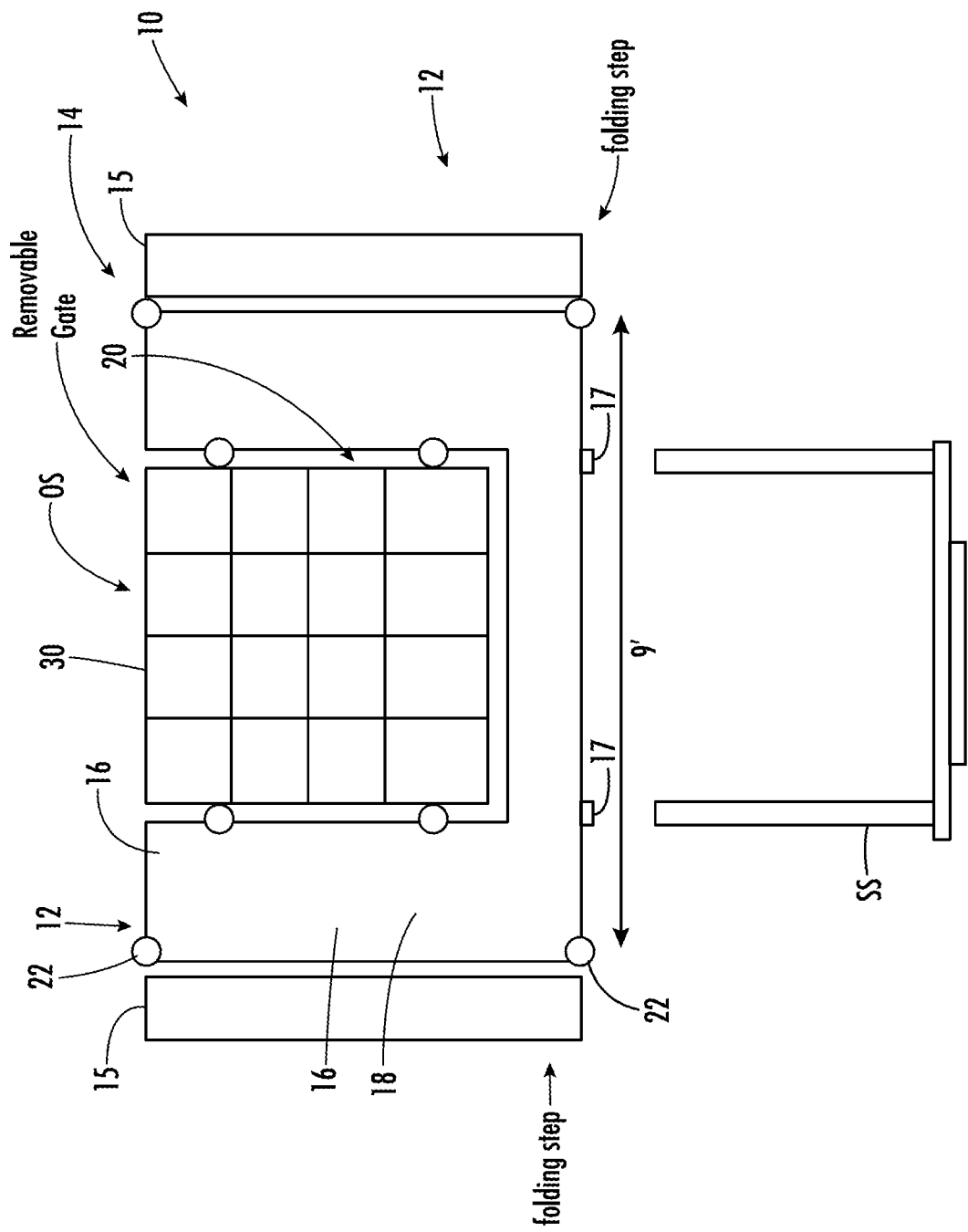
FIG. 12 illustrates a schematic top plan view of an embodiment of a platform system according to the present subject matter.

As stated above, the platform 12 and the flooring structure 16 can have a U-shape with an open side OS on one side such that the central aperture 20 extends through the open side OS as shown in the sketch of FIG. 12. In such embodiments, a portion of the sleeve frame 24 can extend across the open side of the platform 12, which can help reduce or eliminate safety clearances around the openside OS of the platform 12. Additionally, the safety grate 30 can comprise a foldable front gate 42. The foldable front gate 42 can be rotatably or pivotally attached to an end of the safety grate 30, for example, an end of the grid 32 of the crossbar 34. For instance, the foldable front gate 42 can be secured to an end of the grid 32 of the crossbar 34 by hinges. The hinges can permit, for example, the foldable front gate 42 to pivotally rotate around that end of the gird 32 of the crossbar 34 from a storage and/or transport position to a safety position when in use. Once the safety grate 30 is attached to the platform 12, the front gate 42 can be folded downward over the open side OS of the platform 12 and the flooring structure 16. The foldable front gate 42 can be used to hold the bottom of the liner sleeve LS when moving the platform system 12, for example, by a skid-steer SS as show in FIG. 6. For example, the downhole portion of the liner sleeve LS can be bunched up and placed on or pinched by the foldable front gate 42 when assembling and installing the platform system 10. Once the platform system 10 is placed in position over the excavated hole H as shown in FIG. 3, the bottom of the liner sleeve LS can be released over excavated hole H so that the liner sleeve LS can drop into and line the walls of the excavated hole H.

In some embodiments, to further secure components of the platform system together, the sleeve frame 24, the flooring system 16, platform 12, or another portion of the platform system 10 can comprise leg holders 24B for receiving the legs 33 of the safety grate 30 extending downward from the safety grate 30. The legs 33 of the safety grate 30 can be inserted into the leg holders 24B secure to the sleeve frame 24, the flooring system 16, platform 12, or another portion of the platform system 10 to attach the safety grate 30 to the platform system 10.

Figure 4:
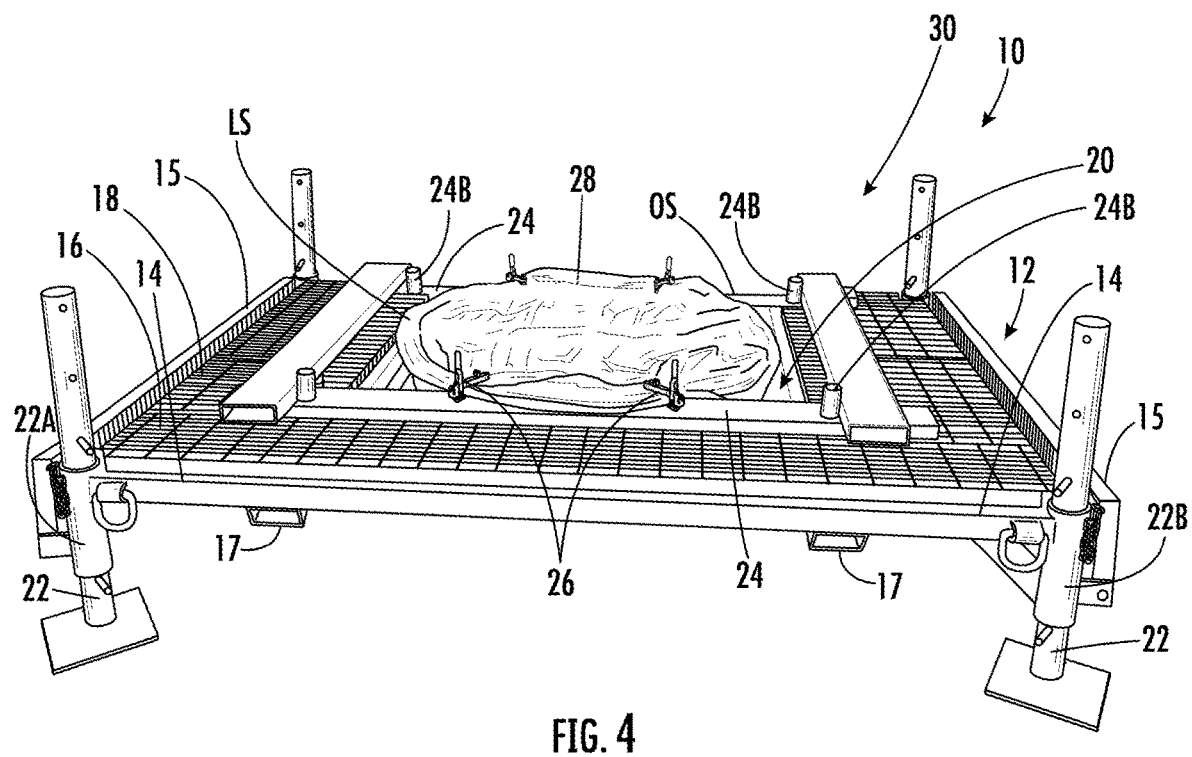
FIG. 4 illustrates perspective view of an embodiment of a platform used in a platform system according to the present subject matter.

In use, the platform system 10 is assembled and then installed over an excavated hole. The platform 12 can be provided at a location near the site where the plant-based remediation system is being installed and near the site where a hole is being dug or has been excavated. The adjustable legs 22 can be set so that the platform 12 is at a desired height. The sleeve frame 24 can be installed on the platform 12 around the central aperture 20. The top or mouth of the liner sleeve LS can be wrapped around the sleeve ring 28 and the sleeve ring 28 and the wrapped portion of the liner sleeve LS can be placed in the sleeve clamps 26 to hold them in place as shown in FIG. 4. The safety grate 30 can be installed on the platform 12. In particular, the legs 33 can be inserted in leg holders 24B to hold the safety grate 30 in place on the platform 12 as shown in FIG. 5 such that the platform system 10 is assembled. The foldable front gate 42 can be folded to a downward position to close off an open side OS of the central aperture 20 and the downhole portion of the liner sleeve LS can be folded or bunched and held by the foldable front gate 42.

The platform system 10 can then be lifted from the site of assembly as shown in FIG. 6 and moved to the site of the excavated hole by the forks of the skid-steer SS engaging the fork channels 17 of the platform 12. The skid-steer SS can position the platform system 10 so that the central aperture 20 and the sleeve ring 28 and the liner sleeve LS align with the excavated hole. The folding funnel guideboards 40A, 40B can be folded out to their funneling angles and tubing AT or other downhole devices can be inserted into the downhole material holders 36 either at the assembly stage or once the platform system 10 is positioned over the excavated hole. Once the platform system 10 is in position over excavated hole, the downhole portion of the liner sleeve LS can be release from the foldable front gate 42. The liner sleeve LS can thus be installed in the excavated hole as shown in FIG. 3, for example, such that the liner sleeve LS lines the walls of the excavated hole. The tubing AT or other downhole devices in the downhole material holders 36 can be inserted further into the liner sleeve LS and the excavated hole to its intended position within the excavated holes. Similarly, if a well casing or monitoring tubing PT is to be installed, these can be inserted into the liner sleeve LS and the excavated hole and held by downhole device clamps 35. Using the folding funnel guideboards 40A, 40B, the platform system 10 can then be used to facilitate the backfilling of the lined excavated hole.

Thus, in addition to a platform and platform system for installation of plant-based remediation systems as discussed above, the present disclosure also provides a safety grate that can comprise a grid of crossbars having a top that faces outward and a bottom that faces downward toward an excavated hole when the safety grate is attached to a platform positioned for installation of a liner sleeve and the backfilling of the lined hole. The safety grate can also comprise folding funnel guideboards that can be secured to the top of the grid of crossbars to funnel soil when backfilling the liner sleeve once the liner sleeve is placed in an excavated hole.

The safety grate can also comprise downhole material holders that can be secured to one or more of the crossbars of the grid of crossbars for holding tubing or other downhole devices that are to reside in the excavated hole. The downhole material holders can be permanently secured to a portion of the grid of crossbars of the safety grate. In some embodiments, one or more of the downhole material holders can comprise ring welded to two crossbars that extend about perpendicular to each other to form a grid corner such that the ring resides in the grid corner. In some embodiments, at least one of the downhole material holders can comprise a holder plate having a holder aperture therethrough that is attachably and detachably securable to a portion of the grid of crossbars of the safety grate that extends over the excavated hole when the platform system in properly positioned over the excavated hole.

The folding funnel guideboards can be secured to a top portion of the grid of crossbars by hinges such that the folding funnel guideboards fold in on top of the grid of crossbars. In some embodiments, the folding funnel guideboards can comprise a first folding funnel guideboard that can be secured on a first side of the grid of crossbars and a second folding funnel guideboard that can be secured on a second side of the grid of crossbars. In some embodiments, the second folding funnel guideboard can comprise a spacer bar that is secured to the hinges for the second folding funnel guideboard such that the first folding funnel guideboard is foldable inward to reside against the grid of crossbars and the second folding funnel guideboard is foldable inward to reside against the first folding funnel guideboard for transporting the safety grate. In some such embodiments, the spacer bar can comprise a thickness that corresponds to the thickness of a first folding funnel guideboard such that the second folding funnel guideboard lays flat against the first folding funnel guideboard. During operation, the first folding funnel guideboard and second folding funnel guideboard are foldable outward to a funneling position such that the first and second folding funnel guideboards are at an obtuse angle as measured from the grid of crossbars to form a funnel-like shape. For example, in some embodiments, the first folding funnel guideboard and second folding funnel guideboard can each extend outward at about 120° as measured from a center portion of the grid of crossbars.

The safety grate can also comprise a foldable front gate. Once the safety grate is attached to the platform, the front gate can be folded downward over an open side of the platform. In some embodiments, the foldable front gate can be used to hold the bottom of the liner sleeve when moving the platform. Once the platform is placed in position over the excavated hole, the bottom of the liner sleeve can be released over the excavated hole so that the liner sleeve can drop in and line the excavated hole. Further, the safety grate can comprise legs extending downward from the bottom of the safety grate. The legs of the safety grate can be inserted into leg holders secured to the platform. One or more downhole device clamps can be secured to a crossbar of the grid of crossbars for holding the downhole device.

Other features include a cross bar that sits on the opposite side that the skid-steer engages the platform. The cross bar can be welded horizontally from each of the front 2 legs holders of the platform. The foldable front grate can be attached to the safety grate and used on all platforms. The foldable gate acts as a holder by bunching the downhole portion of the liner until the platform is placed over the excavated hole. The liner can be folded up while prepared in a staging location, and then opened into the hole once the platform is placed over the hole. The top of the platform can be expanded metal that is sturdy and tread-like but allows soil and water to fall between the expansions. The skid-steer fork channels can be channel iron spaced outside of the liner sleeve ring and the central aperture of the platform. The skid-steer uses special extra-wide forks for engaging and lifting the platform. The folding soil funnels of safety grate can be welded on hinges and can be folded in for transportation. The downhole material holders can be attached to just the safety grate. The downhole material holders can be welded to the safety grates. The legs of the platform can be adjusted in 6" increments. This allows the top of platform to be approximately 1 foot to 2.5 feet above ground surface. To adjust the height of the platform, a worker can lift the platform and adjust the pins as the legs slide through the holes on each corner.

Methods of using a platform system for installation of plant-based remediation systems are also provided as described above. For example, a method can comprise providing a platform system as described above that can comprise a platform comprising a frame supporting a flooring structure having a surface on which a worker can stand. The frame and flooring structure can have a central aperture therein such that the central aperture is through the platform. The platform system can comprise a sleeve frame that can comprise sleeve clamps secured thereto for holding a sleeve ring and a liner sleeve to the sleeve ring. Further, the platform system can comprise a safety grate comprising a grid of crossbars with folding funnel guideboards foldably secured to the grid of crossbars. In some embodiments, the platform system can comprise downhole material holders being secured to one or more of the crossbars of the grid. The method can comprise securing a sleeve frame to the frame of the platform proximal to the central aperture and securing a liner sleeve to the sleeve ring using the sleeve clamps as described above. The method of using the platform system can comprise placing the platform at an excavated hole as described above. For example, the central aperture and liner sleeve can be aligned with the excavated hole as described above. In some embodiments, the height of the platform can be adjusted using adjustable legs. The liners sleeve can be inserted into the excavated hole as described above. The method can also comprise attaching the safety grate to the platform so that the safety grate extends over the central aperture. Additionally, the method can comprise unfolding the funnel guideboards into a position for funneling soil as described above. Further, the method can comprise backfilling the liner sleeve with the funnel guideboards guiding soil into the liner sleeve once the liner sleeve is placed in an excavated hole. Other method steps are described in detail above regarding the using of downhole material holders and use of one or more aeration tubes, piezometer tubes, bentonite layers, or the like in the phytoremediation system.

Thus, as described above, platforms, platform systems, and safety grates used for installation of plant-based remediation systems and related methods for making the same as well as methods for using such platforms, platform systems, and safety grates are disclosed.

These and other modifications and variations to the present subject matter may be practiced by those of ordinary skill in the art, without departing from the spirit and scope of the present subject matter, which is more particularly set forth herein above and any appending claims. In addition, it should be understood the aspects of the various embodiments may be interchanged either in whole or in part. Furthermore, those of ordinary skill in the art will appreciate that the foregoing description is by way of example only and is not intended to limit the present subject matter.

What is claimed is:

1. A platform system for installation of plant-based remediation systems, the platform system comprising:
    a platform comprising a frame supporting a flooring structure having a surface on which a worker can stand, the frame and flooring structure having a central aperture therein such that the central aperture is through the platform;
    a sleeve frame positioned proximal to the central aperture, the sleeve frame having sleeve clamps securable thereto for holding a sleeve ring proximal to at least a portion of the central aperture and to hold a liner sleeve to the sleeve ring; and
    a safety grate configured to be attachable to the platform and extend over the central aperture, the safety grate comprising a grid of crossbars and folding funnel guideboards foldably secured to the grid of crossbars for funneling soil when backfilling the liner sleeve once the liner sleeve is placed in an excavated hole.

2. The platform system according to claim 1, wherein the platform and the flooring structure have a U-shape with an open side on one side such that the central aperture extends through the open side and a portion of the sleeve frame extends across the open side of the platform; and
    wherein the safety grate has a foldable front gate and, once the safety grate is attached to the platform, the front gate folds downward over the open side of the platform.

3. The platform system according to claim 2, wherein the foldable front gate can hold the bottom of the liner sleeve when moving the platform system and, once the platform system is placed in position over the excavated hole, the bottom of the liner sleeve can be released over the excavated hole so that the liner sleeve can drop in and line the excavated hole.

4. The platform system according to claim 1, wherein the sleeve clamps are fixedly secured to the sleeve frame.

5. The platform system according to claim 1, further comprising downhole material holders being secured to one or more of the crossbars of the grid.

6. The platform system according to claim 5, wherein at least one of the downhole material holders comprise a ring welded to two crossbars that extend about perpendicular to each other to form a grid corner such that the ring resides in the grid corner.

7. The platform system according to claim 5, wherein at least one of the downhole material holders comprises a holder plate having a holder aperture therethrough that is attachably and detachably securable to a portion of the grid of crossbars of the safety grate that extends over the excavated hole when the platform system is properly positioned over the excavated hole.

8. The platform system according to claim 1, wherein the folding funnel guideboards are secured to a top portion of the grid of crossbars by hinges such that the folding funnel guideboards fold in on top of the grid of crossbars.

9. The platform system according to claim 8, wherein the folding funnel guideboards comprise a first folding funnel guideboard secured on a first side of the grid of crossbars and a second folding funnel guideboard secured on a second side of the grid of crossbars.

10. The platform system according to claim 9, wherein the second folding funnel guideboard comprises a spacer bar that is secured to the hinges for the second folding funnel guideboard such that the first folding funnel guideboard is foldable inward to reside against the grid of crossbars and the second folding funnel guideboard is foldable inward to reside against the first folding funnel guideboard for transporting the safety grate.

11. The platform system according to claim 10, wherein the spacer bar on the second folding funnel guideboard comprises a thickness that corresponds to the thickness of a first folding funnel guideboard such that the second folding funnel guideboard lays flat against the first folding funnel guideboard.

12. The platform system according to claim 9, wherein the first folding funnel guideboard and second folding funnel guideboard are foldable outward to a funneling position in which the first folding funnel guideboard and second folding funnel guideboard extend outward at about 120° as measured from a center portion of the grid of crossbars.

13. A safety grate for attachment to a platform that is positioned around an excavated hole for installation of plant-based remediation systems, the safety grate comprising:
- a grid of crossbars having a top that faces outward and a bottom that faces downward toward an excavated hole when the safety grate is attached to a platform positioned for installing the plant-based remediation system;
- folding funnel guideboards foldably secured to the top of the grid of crossbars for funneling soil when backfilling the liner sleeve once the liner sleeve is placed in an excavated hole; and
- downhole material holders being secured to the one or more of the crossbars of the grid of crossbars for holding downhole devices that are to reside in the excavated hole.

14. The safety grate according to claim 13, wherein at least one of the downhole material holders comprises a holder plate having a holder aperture therethrough that is attachably and detachably securable to a portion of the grid of crossbars of the safety grate that extends over the excavated hole when the platform system in properly positioned over the excavated hole.

15. The safety grate according to claim 13, wherein the folding funnel guideboards are secured to a top portion of the grid of crossbars by hinges such that the folding funnel guideboards fold in on top of the grid of crossbars.

16. The safety grate according to claim 15, wherein the folding funnel guideboards comprise a first folding funnel guideboard secured on a first side of the grid of crossbars and a second folding funnel guideboard secured on a second side of the grid of crossbars.

17. The safety grate according to claim 16, wherein the second folding funnel guideboard comprises a spacer bar that is secured to the hinges for the second folding funnel guideboard such that the first folding funnel guideboard is foldable inward to reside against the grid of crossbars and the second folding funnel guideboard is foldable inward to reside against the first folding funnel guideboard for transporting the safety grate.

18. A safety grate for attachment to a platform that is positioned around an excavated hole for installation of plant-base remediation systems, the safety grate comprising:
- a grid of crossbars having a top that faces outward and a bottom that faces downward toward an excavated hole when the safety grate is attached to a platform positioned for installing the phytoremediation system;
- folding funnel guideboards foldably secured to the top of the grid of crossbars for funneling soil when backfilling the liner sleeve once the liner sleeve is placed in an excavated hole; and
- a foldable front gate and, once the safety grate is attached to the platform, the front gate being foldable downward over an open side of the platform.

19. The safety grate according to claim 18, wherein the foldable front gate can hold the bottom of the liner sleeve when moving the platform and, once the platform is placed in position over the excavated hole, the bottom of the liner sleeve can be released over the excavated hole so that the liner sleeve can drop in and line the excavated hole.

\* \* \* \* \*